Nov. 2, 1965   W. R. GRAHAM   3,215,119
ANIMAL DRINKING FOUNT
Filed Dec. 23, 1963

INVENTOR.
WALTER ROBERT GRAHAM
BY
Robert C. Woodhams
ATTORNEY

United States Patent Office 3,215,119
Patented Nov. 2, 1965

3,215,119
ANIMAL DRINKING FOUNT
Walter R. Graham, Kalamazoo, Mich., assignor to The Upjohn Company, Kalamazoo, Mich., a corporation of Delaware
Filed Dec. 23, 1963, Ser. No. 332,355
16 Claims. (Cl. 119—75)

This invention relates to an animal drinking fount and more particularly it relates to a nonleaking, low-water pressure, animal activated drinking fount.

There has long been a need for improved water supply means capable of actuation by animals, including birds. This need has been particularly sharply felt where large numbers of small animals such as rats, mice, guinea pigs, hamsters, rabbits, poultry, etc., and kept. The need is compounded when the animals are to be maintained in a closely controlled environment, free of means capable of spreading diseases. Such a closely controlled environment is desired, for example, on animal rearing farms and to a greater degree in animal rooms serving biological research institutions and the like.

Typically, such animal rooms, for example, contain a large number of individual cages or enclosures, each of which must contain at least one source of water. In the past, the conventional water bottle has usually been the water source. These water bottles have been a primary cause of animal room inefficiency due to the need of frequent tending, washing, sanitizing and filling large numbers thereof. Thus, the need for a labor-saving automatic watering device has long been recognized with the result that many such devices have been proposed, virtually none of which have met all the requirements of a practical animal watering system.

Recently a new valve structure was developed which operates on the principal of the hydraulic ram and which has been a great improvement over anything previously tried. This valve structure appears in U.S. Patent No. 3,008,451, assigned to the assignee of the present invention. There are still, however, several serious disadvantages in that the afore-mentioned valve structure was found to work best in a vertical position but attempts to mount such valves in this manner resulted in serious system engineering problems. Further the valve allowed back contamination to adjacent valves in the watering system, such back contamination being potentially ruinous, for example, to biological experiments with animals served by the watering system. Still further, the afore-mentioned valve was unsanitary because it could not readily be removed from the system nor be easily disassembled for cleaning.

Thus, the present invention has resulted from an attempt to improve existing animal watering systems and particularly the animal drinking fount fed by such systems.

Thus, the objects and purposes of this invention include:

(1) To provide a nonleaking, low-water pressure, animal activated drinking fount.

(2) To provide a device, as aforesaid, useable with all types of small animals, including birds, capable of self-watering.

(3) To provide a device, as aforesaid, capable of passing an essentially unlimited supply of clean fresh water upon demand and which minimizes problems of leakage, corrosion and deposition of minerals from hard water.

(4) To provide a device, as aforesaid, conforming with modern colony management and sanitation practices, easily adaptable to any type of cage or housing design, capable of operation with either water tanks or from a fresh water supply controlled by pressure-reducing means and which will be easily and economically installed with a minimum of connections to make, holes to bore and other operations.

(5) To provide a device, as aforesaid, which is inexpensively manufactured and contains a minimum number of parts, which parts are either easily formed from readily available materials or currently available from readily accessible sources.

(6) To provide a device, as aforesaid, which is easily maintained and repaired, which can be completely disassembled for cleaning and service, which is constructed of materials which can be routinely sterilized by autoclaving and which may be easily removed from and replaced on a water system manifold, either singly or in groups, without the necessity of shutting off the water supply to the manifold and which will have a long and trouble-free service life.

(7) To provide a device, as aforesaid, including means preventing the entry of foreign particles into the animal activated valving portion of the device thereby preventing possible jamming thereof in either the open or closed state and which includes means for trapping air bubbles therein, for preventing return of such bubbles to the system and thus prevents contamination of other founts.

Other objects and purposes of this invention will be apparent to persons acquainted with devices of this general sort upon reading the following specification and inspecting the accompanying drawings.

In the following description certain terminology will be used for purposes of convenience in reference only and is neither believed nor intended to be limiting. The words "rightwardly" and "leftwardly" will refer to directions in the particular figures to which reference is made. The terms "upwardly" and "downwardly" will refer to directions taken with respect to the apparatus of the invention in its normal position of use shown in FIGURES 1 and 2. The terms "forwardly" and "rearwardly" will refer to directions along the longitudinal axis of the fount of the invention, the rightward end thereof as appearing in FIGURE 1 being the forward end thereof and the leftward end thereof as appearing in FIGURE 1 being the rearward end thereof. The terms "inwardly" and "outwardly" will refer, respectively, to directions toward and away from the geometric center of the apparatus.

General description

Generally, the objects and purposes of this invention are met by providing means, including a line stub containing a check valve and fixed to a water supply line or manifold. The fount also includes a head which is removably telescopable over or into said line stub and which may be locked thereon. Said head also includes means opening said check valve when said head is installed on said line stub whereby to allow water to flow into said head.

The fount includes a sediment chamber which communicates through an elevated passage with a drinking valve chamber in said head. The drinking valve chamber contains a drinking valve. The drinking valve includes an upwardly facing seat having a downwardly extending opening therein and a movable valve member. Said valve member has an enlarged valve head seatable upon said seat and a stem extending loosely downwardly through said opening so as to be accessible at the underside of the fount whereby actuation of said stem allows water to flow outwardly therepast from said valve chamber.

*Detailed description*

Figure 1:
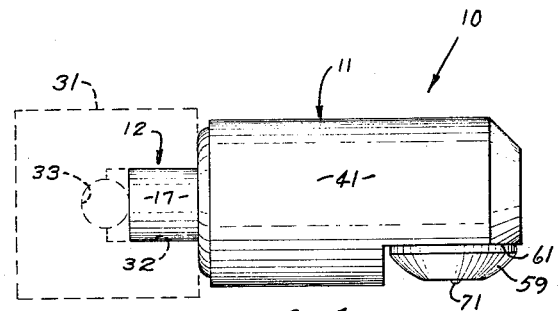
FIGURE 1 is a side view of a water fount embodying the invention.
Figure 2:
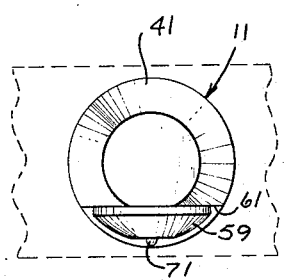
FIGURE 2 is a front end view of the fount of FIGURE 1 as taken from the right-hand side thereof.
Figure 3:
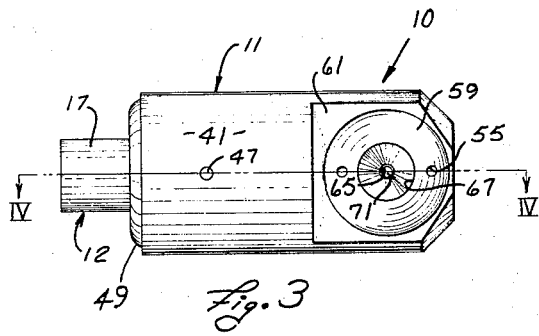
FIGURE 3 is a bottom view of the fount of FIGURE 1.
Figure 4:
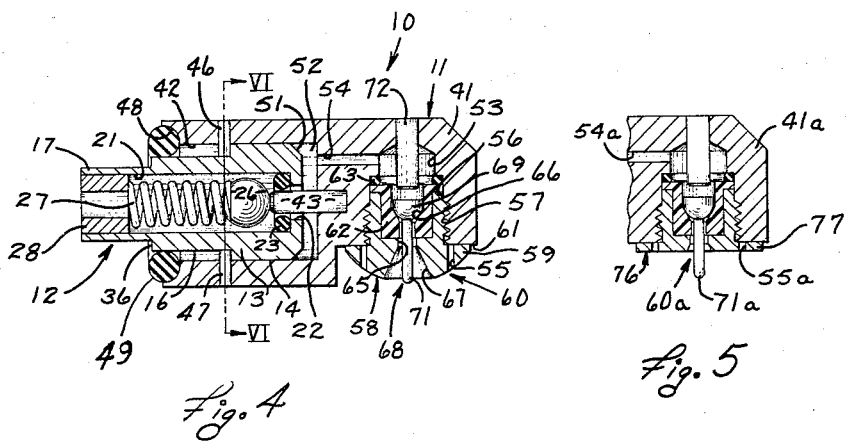
FIGURE 4 is a central cross-sectional view of the fount of FIGURE 1, essentially as taken on the line IV—IV of FIGURE 3.

Referring now to FIGURES 1 and 4, the fount 10 generally comprises a head 11 and line stub 12.

Figure 6:
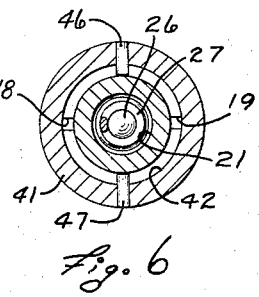
FIGURE 6 is a sectional view taken on the line VI—VI of FIGURE 4.

The line stub 12 includes a check valve housing 13 having a stepped, circularly cylindrical outer surface including a forward portion 14 of relatively large diameter, a midportion 16 of medium diameter and rearward portion 17 of small diameter. The forward portion 14 has a diametrically opposed pair of axial slots 18 and 19 (FIGURE 6) through its axial length and in its outer surface. The check valve housing 13 has a rearwardly opening cylindrical central opening 21 (FIGURE 4) extending to a point near the front end thereof. A coaxial smaller opening 22 communicates with the central opening 21 through the forward wall of the valve housing 13. A resilient ring, such as the O-ring 23, is fitted snugly within the central opening 21 and bears against the forward wall thereof to define a valve seat for a ball 26 resiliently urged thereagainst by a spiral spring 27. The spring 27 bears at its rearward end upon a cylindrical spring retainer 28 which is fixed, by any convenient means such as a press-fit, within the rearward end of the central opening 21.

The line stub 12 may be installed on a low-pressure water line or manifold indicated in broken lines at 31 (FIGURE 1). In such an installation, the rearward portion 17 of the line stub 12 is preferably fixed within an outlet opening 32 by any convenient means, such as a press-fit, said outlet opening 32 communicating with a water supply passage 33 within the manifold 31. In the particular embodiment disclosed in FIGURE 1, the manifold 31 has a flattened surface adjacent the outlet opening 32 which abuts the radial step 36 (FIGURE 4) between the rear portion 17 and the midportion 16 of the check valve housing 13. Thus, water in the supply passage 33 may enter the central opening 21 of the check valve housing 13 through the cylindrical spring retainer 28 but is prevented from further progress, when the head 11 is absent, by the ball 26 bearing against the O-ring 23.

The head 11 of the fount 10 includes a generally circularly cylindrical drinking valve housing 41 having a rearwardly exposed, coaxial, central opening 42 therein. The front end of the central opening 42 is spaced an appreciable distance from the forward end of the drinking valve housing 41. The central opening 42 is of such diameter that the check valve housing 13 may be inserted snugly thereinto. A ball engaging pin 43 centrally extends rearwardly from the forward wall of the central opening 42 and is of sufficient length to engage the ball 26 and push it off its seat 23 when the parts are assembled as shown. A diametrically opposed pair of lock pins 46 and 47 extend radially into the central opening 42 intermediate the ends thereof, whereby said lock pins pass through the slots 18 and 19 when the line stub 12 enters the central opening 42. An annular arcuate recess 48 lies in the rearward portion of the central opening 42. The recess 48 is snugly engageable by a resilient ring such as the O-ring 49, said O-ring 49 also being snugly receivable over the midportion 16 of the check valve housing 13.

Assume that the fount 10 is in its assembled condition, of FIGURE 4. Thus, the head 11 is telescoped over the line stub 12 whereby the forward portion 14 of the check valve housing 13 snugly engages the walls of the central opening 42, the forward portion 14 preferably being chamfered at 51 to facilitate said telescoping. Further, the forward end of the central opening 42 and the forward end of the check valve housing 13 define therebetween a sediment chamber 52. The pin 43 extends through the opening 22 to hold the ball 26 away from the O-ring 23 thereby allowing communication between the central opening 21 of the check valve housing 13 and the aforementioned sediment chamber 52. The head 11 has been rotated on the line stub 12, here a quarter turn, so that the slots 18 and 19 are no longer aligned with the lock pins 46 and 47, which pins lock said head and line stub together by engaging the shoulder defining the rearward end of the forward check valve housing portion 14. Compressive forces of the spring 27 act through ball 26 and pin 43 to tend to urge the head 11 forwardly of the line stub 12 thereby forcibly engaging said lock pins 46 and 47 against the said shoulder. When the line stub 12 is installed on a manifold 31 in the manner shown in FIGURE 1, the O-ring 49 will bear upon the adjacent surface of said manifold, upon the outer surface of the midportion 16 of said check valve housing 13 and upon the arcuate recess 48 in the rear end of the drinking valve housing 41. This bearing relationship seals the rear end of the central opening 42. Said forces also produce sufficient friction that the head 11 cannot be turned on the line stub 12 by the animal served thereby, despite the preferred provision of a thin layer of silicon grease on the O-ring 49 so that the head 11 will turn sufficiently freely to allow being relatively easily locked into position by service personnel.

The forward end of the drinking valve housing 41 includes a downwardly opening valve chamber 53. The valve chamber 53 communicates through a passageway 54 with the sediment chamber 52. The passage 54 is well spaced above the opening 22 in the line stub 12 and is near the upper end of the valve chamber 53. The lower portion 56 of the valve chamber 53 is of enlarged diameter for accepting a drinking valve generally indicated at 60 and has at least its lower part threaded at 57. The drinking housing 41 preferably has a flattened chordal area 61 on its underside through which the valve chamber 53 opens. The drinking valve 60 includes a valve holder 58 which is threadedly engaged within the lower portion 56 by the threads 57 and has an enlarged semispherical head portion 59 which bears upon said area 61. The valve holder head 58 includes a pair of downwardly opening holes 55 spaced from the center thereof being engageable by any convenient means such as a spanner wrench whereby the valve holder may be more easily engaged with and disengaged from the head 11. The valve holder 58 has an insert 62, preferably of Teflon, in the upper part thereof. An O-ring 63 lies between and bears against the upper side of the insert 62 and the downwardly facing shoulder defined by the upper end of the lower valve chamber portion 56. The insert 62 contains an upwardly opening frustroconical valve seat 66 which communicates at its lower end through a valve guide opening 65 with a downwardly facing frustro-conical opening 67 in the valve holder 58. The valve member 68 has a stem portion 71 surmounted by a hemicylindrical head 69 which is capable of contacting or moving upwardly away from the valve seat 66. The valve head 69 is preferably of silicon rubber and is preferably molded onto the stem 71 which is preferably of a noncorrosive material such as stainless steel. The stem portion 71 is slidable vertically in the valve guide opening 65 and has a sufficiently loose fit therein that water may exit therepast from the valve chamber 53 when the valve 60 is open. An abutment pin 72 extends downwardly into the valve chamber 53 to a point somewhat above the top of the valve member 68 when same is in its lowermost or closed position and prevents the rise of said member 68 beyond a predetermined point.

The fount 10, when viewed from the front thereof (FIGURE 2), defines a circle within which lies the valve holder head 59 and the valve stem 71 so that said head 11 can easily be passed through relatively small openings, which may conveniently be circular, in animal cages.

*Operation*

Although the operation of the fount embodying the invention has been given somewhat hereinabove, same will be described in detail hereinbelow to assist a clear understanding of the invention.

Assuming that the line stub 12 has been installed as above discussed on the water bearing manifold 32 (FIGURE 1) and that the fount 10 is in its assembled condition shown, water will flow from the passage 33 through the spring retainer 28 and into the central opening 21 of the check valve housing 13. Since the ball 26 is held away from the O-ring 23 comprising its seat by the pin 43, such water will flow out of the central opening 21 of the check valve housing 13 through the opening 22 and into the sediment chamber 52. Foreign particles carried in the water to this point will tend to be deposited in said sediment chamber 52 due to the flow conditions therein. Thus, water entering the chamber 53 through the passage 54 will be essentially free of foreign particles which might disrupt the operation of the valve 60. Furthermore, the relatively high position of the passage 54 with respect to the passage 22 and valve 60 tends to cause any air present in the head 11 to be entrapped therein or in the upper portion of the chambers 52 and 53 to prevent the return thereof to the manifold 31. Thus, impurities which might be entrained in such air are prevented from traveling from one fount to another and the spread of bacteria or other contaminants is thereby prevented. Entry of water into the valve chamber 53 tends to push the valve head 69 downwardly against the seat 66 with a hydraulic ram action to close the valve 60. The water pressure from the manifold 31 is necessarily low to prevent oversupply of water to a small animal drinking from the fount 10. Thus, the low pressure combines with a relatively small valve head area whereby the force holding the valve 60 closed will be sufficiently small that a small animal may open said valve 60 by moving the stem 71 upwardly. Upon the opening of the valve 60, water flows downwardly past the seat 66 and valve stem 71 to supply said animal. It will be understood that the rate of water supplied depends both on the water pressure and on the clearance between the valve stem 71 and the valve guide opening 65. Upon cessation of the upward force on the valve stem 71, the valve head 69 is forced downwardly by water pressure on the upper end thereof and into contact with the seat 66 to close the valve 60.

If desired, the head 11 may easily be removed from the line stub 12 and hence manifold 31 by a simple twisting motion to align the pins 46 and 47 with the slots 18 and 19 whereafter the head 11 may merely be moved forwardly to disengage it from the line stub 12. During this forward movement the pin 43 will allow the ball 26 to be urged against the O-ring 23 by the spring 27 whereby supply of water out of the central opening 21 is stopped. Thus, removal of the head 11 in no way requires a shutdown of supply to the manifold 31 and hence does not disrupt the water supply to other founts on the manifold. The head 11 may after such removal be cleaned and sterilized by autoclaving or other means desired.

The head 11 is easily disassembled by unthreading the valve holder 58 from the drinking valve housing 41. This allows removal of the O-ring 63 from the chamber 53 and the removal of valve member 68 from the valve holder 58. Furthermore, although the Teflon insert 62 is normally relatively tightly fitted within the valve holder 58 it may be desired to establish a clearance therebetween sufficient to allow ready removal of the insert 62 from the valve holder 58. In any event, it will be apparent that the parts of the head 11 are readily separable for individual inspection, cleaning or repair.

*Modification*

Figure 5:
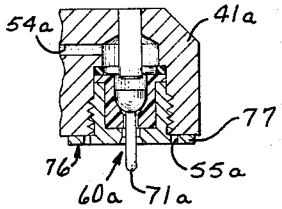
FIGURE 5 is a fragment of FIGURE 4 showing a modification thereof.

FIGURE 5 discloses a modified valve holder 76 which has a relatively thin, flat head portion 77 whereby the valve stem 71a extends downwardly therefrom a larger distance than the valve stem 71 of FIGURE 4 extends downwardly from the valve holder 58. The greater exposure of the valve stem 71a allows same to be actuated by a licking or other similar action on the part of the animal served by the valve. In effect, the valve stem 71a is operable by a relatively broad flat object being forced upwardly thereagainst. This is in direct opposition to the actuation of the valve stem 71 of FIGURE 4. This is actuated upwardly by movement thereagainst of an upstanding, relatively pointed object, for example, the nose of a rat. Thus, it will be seen that the fount 10 is relatively easily modified to be actuable by a variety of animals despite different habits and physiological structure.

Although particular preferred embodiments of the invention have been disclosed hereinabove for purposes of illustration, variations or modifications of such disclosure which lie within the scope of the appended claims are fully contemplated.

What is claimed is:

1. An animal drinking fount fed from a water supplying manifold, comprising the combination:
    check valve means affixed to said manifold and including resiliently urged closure means normally holding said check valve in closed condition;
    a drinking valve head including a mounting zone and a valve zone, said mounting zone comprising a mounting opening within said head telescopable over said check valve means and locking means for positively limiting movement of said head away from said check valve means, said valve head including also projecting means mounted within said head projecting into said opening and engageable with said closure means for unseating same when said head is locked into position, said check valve closure means acting through said projecting means for urging said head against said locking means to its limit position;
    means defining a vertically aligned valve chamber opening in said valve zone of said head and removable means normally received into the lower end of said valve opening, a valve seat within said last-named means and a liquid discharge opening extending downwardly therethrough, a valve removably engaging said seat and having an actuating pin extending downwardly through said liquid discharge opening;
    means defining a passageway connecting said mounting opening with said valve chamber opening for conducting liquid from said check valve means to said valve chamber opening.

2. The device defined in claim 1 wherein the forward wall of said mounting opening is spaced from said check valve means sufficiently to define a sediment chamber therebetween.

3. The device defined in claim 1 wherein said passageway is placed substantially adjacent the uppermost limits of both said mounting opening and said valve chamber opening for providing an air trap therein.

4. The device defined in claim 1 wherein said passageway is placed vertically above the location of the point of discharge of said check valve and said valve seat to provide an air trap therebetween.

5. An animal drinking fount comprising a line stub having a horizontally disposed inlet means, a head member having outlet means and a depending animal-operable valve in said outlet means, and means defining a passageway connecting said inlet means and outlet means;
    said means defining the passageway having a vertical section adjacent to said inlet means and a horizontal section leading from the upper end of said vertical section into said outlet means, said vertical section of the passageway being defined by spaced-apart upright wall means of the line stub and the head member, which vertical section extends upwardly above said inlet means, said horizontal section extending through said wall means of the head member adjacent the upper end thereof substantially above said inlet means whereby a vertical column of water is interposed between said outlet means and said inlet means which acts as a bar to the passage of air bubbles from said outlet means to said inlet means.

6. The device defined in claim 5 wherein the uppermost point on said horizontal section of said passageway connects with the vertical section thereof at a point below the top of said vertical section whereby the portion of said vertical section above said horizontal section constitutes an air trap to entrap any air bubbles entering said passageway through said outlet means.

7. The device defined in claim 6 in which the head member is detachably connected with said line stub and at least the vertical section of said passageway above the horizontal section thereof and which constitutes said air trap is formed in part by a wall of said line stub and in part by a wall of said head member whereby when said head member is detached said air trap is opened to permit escape of any entrapped air.

8. The device defined in claim 5 in which the outlet means includes means defining a chamber having a domed portion at a level above the horizontal section of said passageway constituting an air trap to entrap bubbles which may enter through said outlet means.

9. The device defined in claim 5 in which the vertical section of said passageway extends to a point below said inlet means and constitutes a sediment trap.

10. The device of claim 9 in which the head member is detachably connected with said line stub and at least the vertical section of said passageway below said inlet means and which constitutes said sediment trap is formed in part by a wall of said line stub and in part by a wall of said head member whereby when said head member is detached said sediment trap is opened to permit easy removal of entrapped sediment.

11. An animal drinking fount fed from a water supplying manifold, comprising:
    an elongated hollow line stub adapted to be secured to the manifold and having an inlet opening at one end thereof and an outlet opening at the other end thereof;
    a head having a tubular mounting portion slideably and rotatably telescoped over said line stub, relatively rotatable interlocking means on said line stub and said tubular portion for releasably securing said head on said line stub, said head being removable from said stub by rotating said head through an arc of less than a full circle to disengage said interlocking means and then sliding said head axially off said line stub;
    said head having an internal wall opposed to and spaced from said outlet opening to provide a first chamber therebetween, said head having a second chamber which opens downwardly, said head having a passage connecting said first and second chambers;
    a valve unit mounted within said second chamber below said passage, said valve unit including means defining an outlet opening having a valve seat at the upper end thereof and a vertically movable valve element releasably engageable with said seat and having an actuating stem projecting downwardly through said outlet opening.

12. An animal drinking fount as defined in claim 11, in which a sealing ring is received in a groove in the rear end of said tubular portion and projects outwardly therefrom into sealing contact with said manifold to prevent leakage of liquid from said manifold around said line stub.

13. An animal drinking fount as defined in claim 11, in which said head has a valve zone projecting forwardly from said mounting portion, said valve zone being of smaller size than said mounting portion and having a lower surface, the entirety of said valve zone being disposed entirely within the perimeter of said mounting portion, said second chamber being provided in said valve zone and opening downwardly through said lower surface; and
    said valve unit having an enlarged head portion disposed outside of said second chamber and bearing on said lower surface of said valve zone, said enlarged head portion also lying entirely within the perimeter of said mounting portion.

14. An animal drinking fount according to claim 13, in which said head portion has a substantially flat lower surface and said stem projects a substantial distance below said lower surface of said head portion, said outlet opening being of substantial extent and closely surrounding said stem whereby said stem is protected against forces laterally applied thereto by an animal, whereby an animal can open said valve by pushing said valve stem upwardly.

15. An animal drinking fount according to claim 13, in which said head portion has a downwardly opening, frusto-conical recess in its lower end and said stem projects substantially to but not appreciably beyond the bottom of said recess, whereby an animal can open said valve by placing its nose in said recess and thereby pushing said valve stem upwardly.

16. An animal drinking fount connected to a water-supplying manifold, comprising:
    connecting means adapted to be detachably connected at one end thereof to said manifold, said connecting means having an opening therethrough so that water can flow through said connecting means, said connecting means having an end wall at the other end thereof through which said opening extends substantially at the center thereof;
    housing means attached to said connecting means and having a wall spaced from and opposed to said end wall of said connecting means and a peripheral wall extending between said walls at the outer edges thereof and defining therewith an upright sediment chamber, said sediment chamber extending both above and below said opening whereby foreign particles in the water flowing out of said connecting means will be deposited in said sediment chamber and fall to the bottom thereof;
    means defining a downwardly opening valve chamber and a single passage connecting said valve chamber only to the upper end of said sediment chamber and above said opening whereby said fluid can flow from the uper end of said sediment chamber into said valve chamber; and
    a drinking valve housing having actuating means extending downwardly out of said valve chamber, said passage being located above the opening of said connecting means and above said drinking valve to provide an air trap preventing air therewithin from flowing back through said connecting means into said manifold.

References Cited by the Examiner

UNITED STATES PATENTS

| 2,486,729 | 11/49 | Beckley | 119—72.5 |
| 2,678,630 | 5/54 | Fredricksen | 119—75 |
| 2,845,046 | 7/58 | Hart | 119—75 |
| 2,873,051 | 2/59 | Hamburg et al. | 222—396 |

FOREIGN PATENTS

| 26,012/30 | 4/30 | Australia. |

SAMUEL KOREN, *Primary Examiner.*

HUGH R. CHAMBLEE, *Examiner.*